June 11, 1929.  F. L. MACKENZIE  1,716,592
WORK SUPPORT
Filed July 15, 1927   2 Sheets-Sheet 1

INVENTOR.
Fred L. Mackenzie
By his Attorney
Nelson M Howard

June 11, 1929.　　F. L. MACKENZIE　　1,716,592
WORK SUPPORT
Filed July 15, 1927　　2 Sheets-Sheet 2
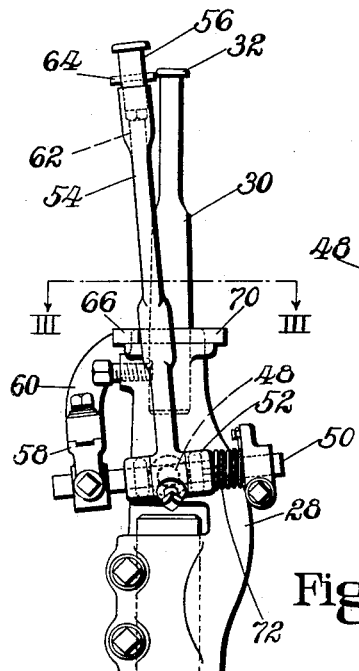
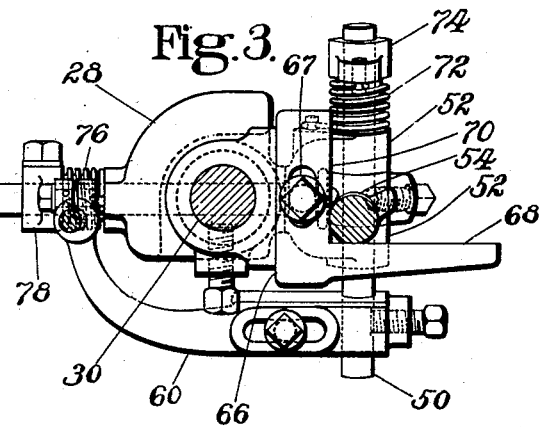
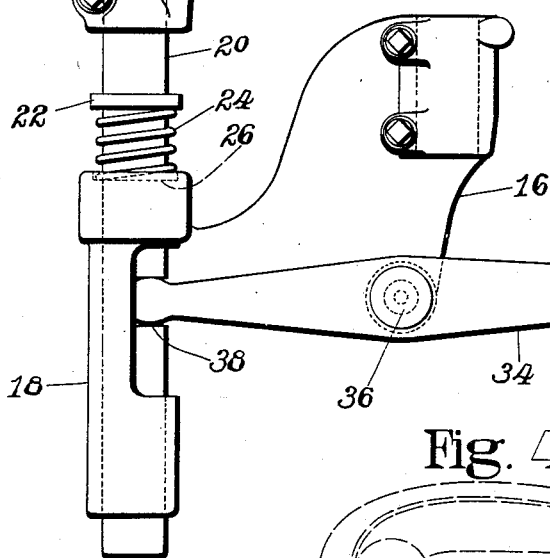
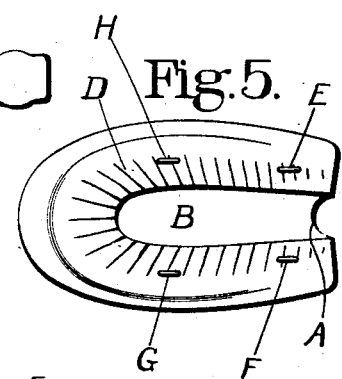
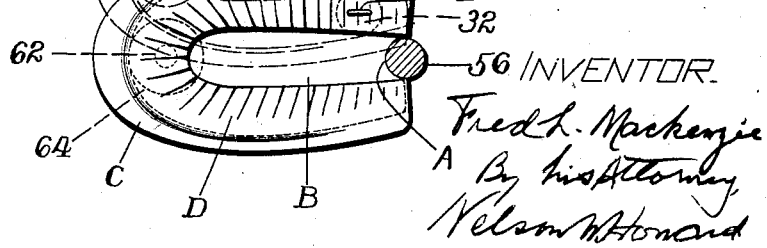
INVENTOR.
Fred L. Mackenzie
By his Attorney
Nelson W. Howard Patented June 11, 1929.

1,716,592

UNITED STATES PATENT OFFICE.

FRED L. MACKENZIE, OF BEVERLY, MASSACHUSETTS, ASSIGNOR TO UNITED SHOE MACHINERY CORPORATION, OF PATERSON, NEW JERSEY, A CORPORATION OF NEW JERSEY.

WORK SUPPORT.

Application filed July 15, 1927. Serial No. 206,017.

This invention relates to work supports and is illustrated as embodied in a fastening inserting machine having a novel work support arranged to facilitate the presentation of a work piece successively in different relations to the fastening inserting instrumentalities of the machine.

In the manufacture, for example, of molded counter turned shoes, it is usual to fasten a flat piece of sheet material, called a "tuck", to the inner surface of the flange of the counter, said tuck being of a shape substantially to fill the area at the bottom of the counter, and when fastened in place holding the sides of the counter against transverse displacement. The illustrated work support was developed primarily for the purpose of facilitating the handling of tucks and counters while they are being fastened together and the invention is accordingly disclosed herein with particular reference to that work and as embodied in a staple inserting machine adapted for stapling tucks and counters together. It should be understood, however, that this is merely an example of a machine in which the invention may be embodied, and that the invention is not limited in its utility either to embodiment in fastening inserting machines or, necessarily, to use in machines for operating on tucks and counters.

It is an object of the present invention to provide an improved work support arranged to facilitate the presentation of a work piece, such as one consisting of a tuck and counter, successively in a plurality of different positions relatively to the operating instrumentalities of a machine which is to operate upon the work piece. Preferably, and as illustrated, the work support is provided with positioning members arranged to engage the work piece and movable therewith to control its position relatively to the operating instrumentalities of the machine as the work piece is moved between the performance of successive operations thereof.

In accordance with a feature of the invention the work piece positioning members of the work support of the illustrated machine are mounted for movement both forwardly and rearwardly of the machine and transversely thereof, springs being provided tending to move the work support transversely and in a direction at right angles thereto into engagement with a stop, preferably adjustable, which determines their normal position. When fastening a tuck to a counter by means of a fastening inserting machine equipped with my novel work support, the tuck is placed within the counter in the position relatively thereto in which it is to be fastened, the tuck and the counter being placed upon the clenching anvil of the machine with one of the positioning members engaging a notch at the forward end of the tuck and another positioning member beneath and engaging the flat inner surface of the tuck at the rear of the tuck and substantially in engagement with the rear surface of the counter. With the positioning members in the position which they normally assume under the influence of the springs and stop above referred to, a fastening is driven through the forepart of the flange of the counter and through the tuck and is clenched upon the inner surface of the tuck. Then the tuck and counter are moved transversely of the counter and rearwardly of the machine, the positioning members moving with the counter against the action of one of the springs and a second fastening is inserted opposite to the first and through the flange at the other side of the counter, the position of the fastening widthwise of the counter being determined by engagement of the side wall of the counter with the clenching anvil of the machine. Next the work piece is moved by the operator transversely of the machine, and forwardly of the counter, against the force of the other spring, the work positioning means again moving with the counter, and a third staple is inserted on the same side of the counter as the second. Then the counter and the positioning members are moved forwardly of the machine and transversely of the counter under the force of the first spring and as far as is permitted by the stop, and a fourth staple is inserted through the flange at the same side of the counter as the first.

With the above and other objects and features in view, the invention will now be described with reference to the accompanying drawings and pointed out in the claims.

In the drawings,

Fig. 2 is a side elevation on a larger scale than Fig. 1 of the work support and associated parts of the machine;

Fig. 3 is a horizontal section on the line III—III of Fig. 2;

Fig. 4 is a view of the bottom of a counter in process of being stapled to a tuck with the aid of the work support to Figs. 1, 2 and 3; and, Fig. 5 is a bottom view of a counter with a tuck stapled thereto.

Figure 1:
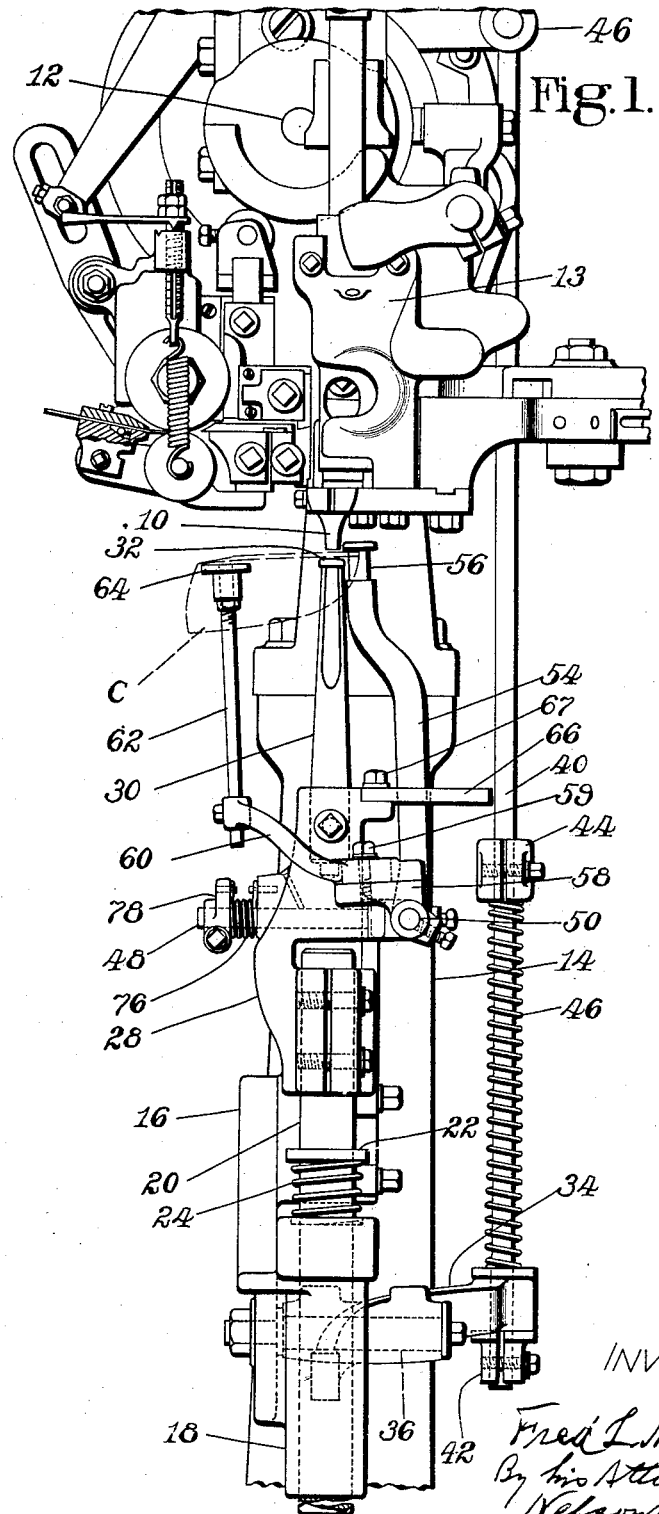
Fig. 1 is a front elevation of a staple inserting machine provided with a work support in accordance with the present invention.

Fig. 1 of the drawings illustrates the work support as embodied in a staple fastening machine of the type disclosed in Letters Patent of the United States No. 1,016,930, granted February 13, 1912 on an application of William H. Borden. Since the present invention is in no way concerned with the details of the fastening inserting instrumentalities of the machine, there is no necessity for describing them in this specification except to state that the fastenings are driven by suitable means through a throat opening in a nozzle 10 with which the head of the machine is provided, power for operating the fastening inserting instrumentalities being supplied from a suitably operated cam shaft 12. For further details of the illustrated machine reference may be had to said Letters Patent No. 1,016,930.

The fastening inserting instrumentalities of the machine are carried by a head 13 mounted upon the upper end of a column 14 which also supports a bracket 16 (see particularly Fig. 2) provided with a vertical sleeve 18 containing a bearing for a post 20 mounted for vertically sliding movement and provided with a collar 22 forming an abutment for the upper end of a heavy coil spring 24 surrounding the post 20 and bearing at its lower end against a seat 26 formed at the upper end of the sleeve 18. To the upper end of the post 20 is clamped another bracket 28 having at its upper end a socket in which is clamped the lower end of a support 30 for a clenching anvil 32.

As is common in machines of this type, mechanism is provided to move the post 20 upwardly so as to clamp the work piece between the clenching anvil 32 and the nozzle 10 when a fastening is being driven, and to move the post 20 downwardly to release the clamping pressure upon the work piece while the latter is moved between the insertion of successive fastenings. This mechanism includes a lever 34 (Figs. 1 and 2) fulcrumed at 36 to the bracket 16 and bearing at its forward end in a notch 38 formed in the horn post 20. At its rear end the lever 34 is bored loosely to receive a rod 40 (Fig. 1) having a collar 42 clamped to its lower end to limit upward movement of the rod 40 relatively to the lever 34 and also having clamped thereto a second collar 44 some distance above the rear end of the lever 34. A spring 46, not so stiff as the spring 24, surrounds the rod 40, bearing at its upper end against the collar 44 and at its lower end against the lever 34. At its upper end the rod 40 is pivoted to a lever 46 rocked at suitable times in the operation of the machine by a cam carried by the shaft 12. Thus it will be seen that upward movement of the rod 40 positively rocks the lever 34 in a counter-clockwise direction as shown in Fig. 2, thereby pulling the post 20 downwardly against the action of the spring 24 while downward movement of the rod 40 rocks the lever 34 impositively in a clockwise direction as viewed in Fig. 2, since the spring 46 can yield when it is no longer possible further to raise the anvil 32 and its support 30.

Work positioning members arranged to facilitate the presentation of a counter and a tuck to the fastening inserting instrumentalities of the machine will now be described. A short horizontal shaft 48 has a bearing in the bracket 28, extending transversely of the machine. A second shaft 50 extending from the front to the rear of the machine in a direction at right angles to the shaft 48 is mounted in bearings formed in a yoke 52 carried by the right-hand end of the shaft 48 (Fig. 1). Clamped to the median portion of the shaft 50 is a work positioning member comprising an upwardly extending arm 54 carrying at its upper end a cylindrical member 56 formed to engage a semi-circular notch A in the forward end of a tuck B (Fig. 4). Clamped to the forward end of the shaft 50 (at the left as shown in Fig. 2) is a bracket 58 to which is secured, by a screw and slot connection 59, an arm 60 extending transversely (to the left in Fig. 1) and then rearwardly of the machine and formed at its other end with a bearing to which is adjustably clamped a second work positioning member comprising an upwardly extending rod 62 which carries at its upper end a button-like member 64 having a flat top serving as a positioning surface to engage the flat inner surface of a tuck at the rear thereof and substantially in engagement with the rear surface of a counter to which the tuck is to be fastened.

The bracket 28 carries at its upper end a stop 66 adjustably mounted by a screw and slot connection 67 and provided with a transversely extending positioning surface 68 and a forwardly and rearwardly extending positioning surface 70 (Fig. 3) positioned in the path of movement of the arm 54 as the latter is rocked about the axes of the shafts 48 and 50 respectively. A spring 72 anchored at one end to a collar 74 secured to the shaft 50 and at the other end to the yoke 52 tends to rotate the shaft 50 in a direction to hold the arm 54 in engagement with the positioning surface 70 of the stop 66. A similar spring 76 anchored at one end to the bracket 28 and at the other end to a collar 78 secured to the shaft 48 tends to rock the shaft 48 in a direction to cause the arm 54 to engage the positioning surface 68 of the stop 66. The rod 62 with its tuck engaging member 64 partakes also of whatever movement is imparted to the arm 54 either by the force of springs 72, 76 or manually against the resistance of those springs.

The stop member 66 is so adjusted as to cause the cylindrical member 56 carried by the arm 54, when engaged in the notch A in the forward end of a tuck B, to position the tuck and a counter C, the inner surface of the flange D of which has been properly positioned manually relatively to the tuck, for the insertion of fastenings to secure the two together, in such a position relatively to the nozzle 10 and the anvil 32 that, with the parts in the position they naturally assume under the action of the springs 72 and 76, the fastening inserted will take the position shown in solid lines at E in Fig. 4. By reference to that figure it will also be observed that the member 64 carried by the rod 62 is so adjusted as to engage the inner surface of the tuck B at the rear of the tuck and substantially in engagement with the rear-end surface of the counter C. After the fastening shown at E has been inserted, the operator, who preferably maintains his hold upon the counter C during the entire operation, moves the counter transversely of itself (rearwardly of the machine), the arm 54 and the rod 62 with the member 64 yielding against the action of the spring 76 until the side wall of the counter nearest the operator brings up against the anvil 32. At this time the counter will be in the position shown by broken lines in Fig. 4 relatively to the anvil 32. A second staple F (see Fig. 5) is then inserted. The tuck and counter are then moved toward the right, as illustrated in Figs. 1 and 4, one and one-half inches more or less, the arm 54 and the rod 62 moving with the counter against the force of the spring 72. With the counter in this position a third staple G is inserted, after which the counter is allowed to move forwardly of the machine and transversely of the counter, the arm 54 and the rod 62 being impelled by the spring 76, and a fourth staple H is inserted. It will be noted that while these staples are being inserted the positioning of the staples widthwise of the counter is determined with a sufficient degree of accuracy either by the position of the notch-engaging member 56 carried by the arm 54 (when staple E is being inserted), by the side surface of the counter when staples F and G are being inserted, or by both when staple H is being inserted, while the button-like member 64 carried by the upper end of the rod 62 serves to facilitate the proper positioning of the tuck relatively to the flange of the counter heightwise of the counter and serves also to maintain the length of the counter generally transversely of the machine.

Having thus described my invention, what I claim as new and desire to secure by Letters Patent of the United States is:

1. A work support comprising a post, a positioning member carried by the post and mounted for movement both transversely of the machine and forwardly and rearwardly of the machine, and means at all times tending to move said positioning member forwardly and transversely of the machine, and means for limiting said movements of the positioning member.

2. A fastening inserting machine having a post, a clenching anvil carried thereby in alinement with the fastening inserting instrumentalities of the machine, a pair of work positioning members carried by the post and mounted for movement as a unit relatively to the clenching anvil about two substantially horizontal axes at right angles to each other, a stop carried by the post, and means urging the positioning members toward a position where further movement of said members is prevented by said stop.

3. A fastening inserting machine having a post, a clenching anvil carried thereby in alinement with the fastening inserting instrumentalities of the machine, a pair of work positioning members carried by the post and mounted for movement as a unit relatively to the clenching anvil about two substantially horizontal axes at right angles to each other, a stop carried by the post and having two positioning surfaces substantially at right angles to each other arranged to engage one of the positioning members, and means urging the last-named positioning member toward the intersection of the positioning surfaces of said stop.

4. A work support for presenting a counter and a tuck to a fastening inserting machine and for positioning the counter and tuck relatively to the fastening inserting instrumentalities of the machine comprising a post, a pair of positioning members carried by the post and mounted for movement as a unit both transversely of the machine and forwardly and rearwardly of the machine, and a pair of springs one of which tends to move said positioning members forwardly and the other of which tends to move said positioning members transversely of the machine, and means for limiting the movement of the positioning members under the influence of said springs.

5. A work supporting and positioning device comprising a post, a shaft having a bearing carried by the post, a second shaft arranged transversely of and carried by the first shaft, a pair of positioning members carried by the second shaft in fixed relation to each other, a stop member carried by the post, and a spring connected to each shaft, the springs tending to rotate the shafts in a direction to cause the positioning members to take a position determined by the stop member.

6. A work supporting and positioning device comprising a substantially vertical post, a substantially horizontal shaft having a bearing carried by the post, a second substantially horizontal shaft arranged transversely of and carried by the first shaft, a pair of positioning members carried by the second shaft in adjustable but fixed relation to each other, a stop member carried by the post, and a spring connected to each shaft, the springs tending to rotate the shafts so as to cause the positioning members to take a position determined by the configuration and position of the stop member.

7. A positioning device arranged to present a work piece to a machine for the performance of an operation thereon comprising a shaft, a second shaft carried by the first at right angles thereto, a pair of positioning members carried by the second shaft arranged to engage and position a work piece, a stop member having two positioning surfaces substantially at right angles to each other arranged to limit the movement of said positioning members in two directions at right angles to said positioning surfaces, and means tending to move one of said positioning members toward said positioning surfaces.

8. A positioning device arranged to present a work piece to a machine for the performance of an operation thereon comprising a shaft, a second shaft carried by the first at right angles thereto, a pair of positioning members carried by the second shaft arranged to engage and position a work piece, a pair of springs, one tending to rotate each shaft, and a stop member having two positioning surfaces substantially at right angles to each other arranged to engage one of the positioning members, the two surfaces of the stop member limiting the movement of the positioning members under the action of the springs.

9. A machine for fastening tucks to counters having a work support provided with a clenching anvil and a pair of positioning members movable relatively to the anvil, one of said positioning members being arranged to engage the forepart of a tuck and the other positioning member to engage the flat surface of the tuck at the rear, means tending to move the positioning members transversely of the machine and in a direction at right angles thereto, and a stop arranged to limit the movement of the positioning members but permitting manual movement of the positioning members against the action of said means.

10. A machine for fastening tucks to counters having a work support provided with a clenching anvil and a pair of positioning members movable relatively to the anvil, one of said positioning members being arranged to engage a notch in the forepart of the tuck and the other positioning member having a flat top to engage the flat surface of the tuck at the rear, a pair of springs, one tending to move the positioning members transversely of the machine and the other tending to move the positioning members at right angles to the first, and a stop arranged to limit the movement of the positioning members under the influence of the springs but permitting manual movement of the positioning members against the action of the springs.

In testimony whereof I have signed my name to this specification.

FRED L. MACKENZIE.